H. L. SCHROEDER.
BAKER'S PEEL.
APPLICATION FILED FEB. 8, 1916.
1,195,510.
Patented Aug. 22, 1916.
2 SHEETS—SHEET 2.
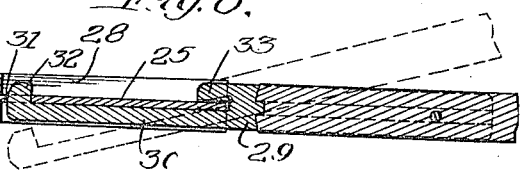
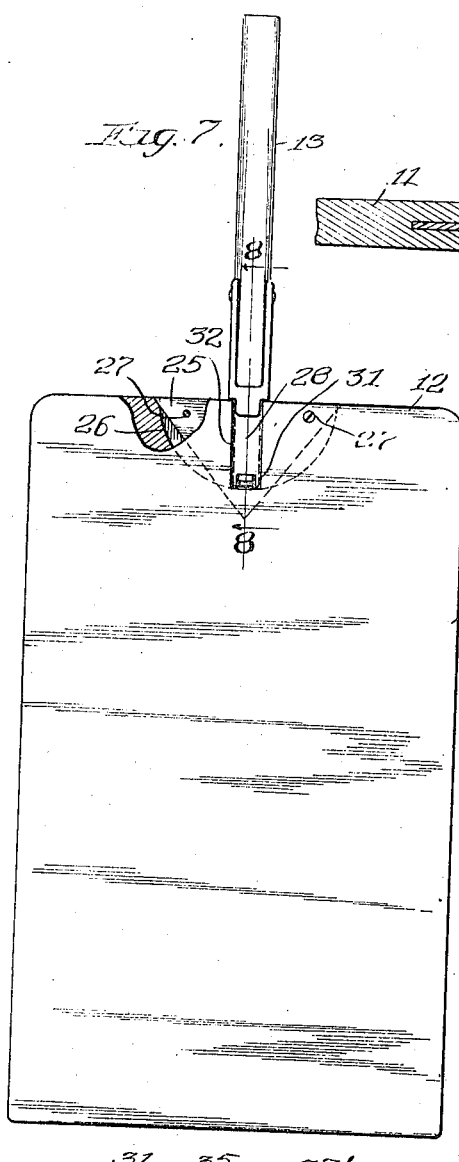
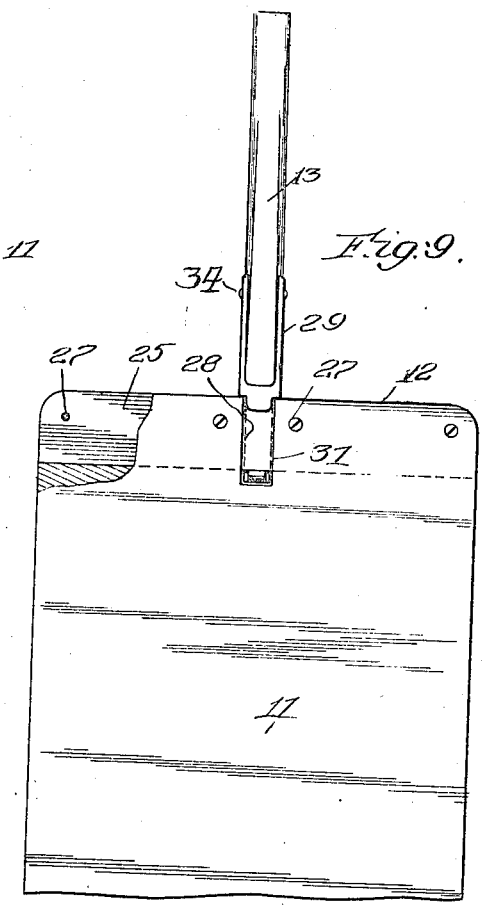
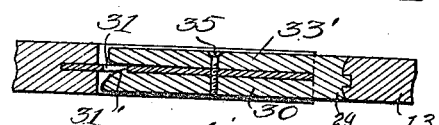
Witness:
R. L. Farrington
Inventor,
Henry L. Schroeder.
By Brown, Niesen & Sprinkle
Attys.

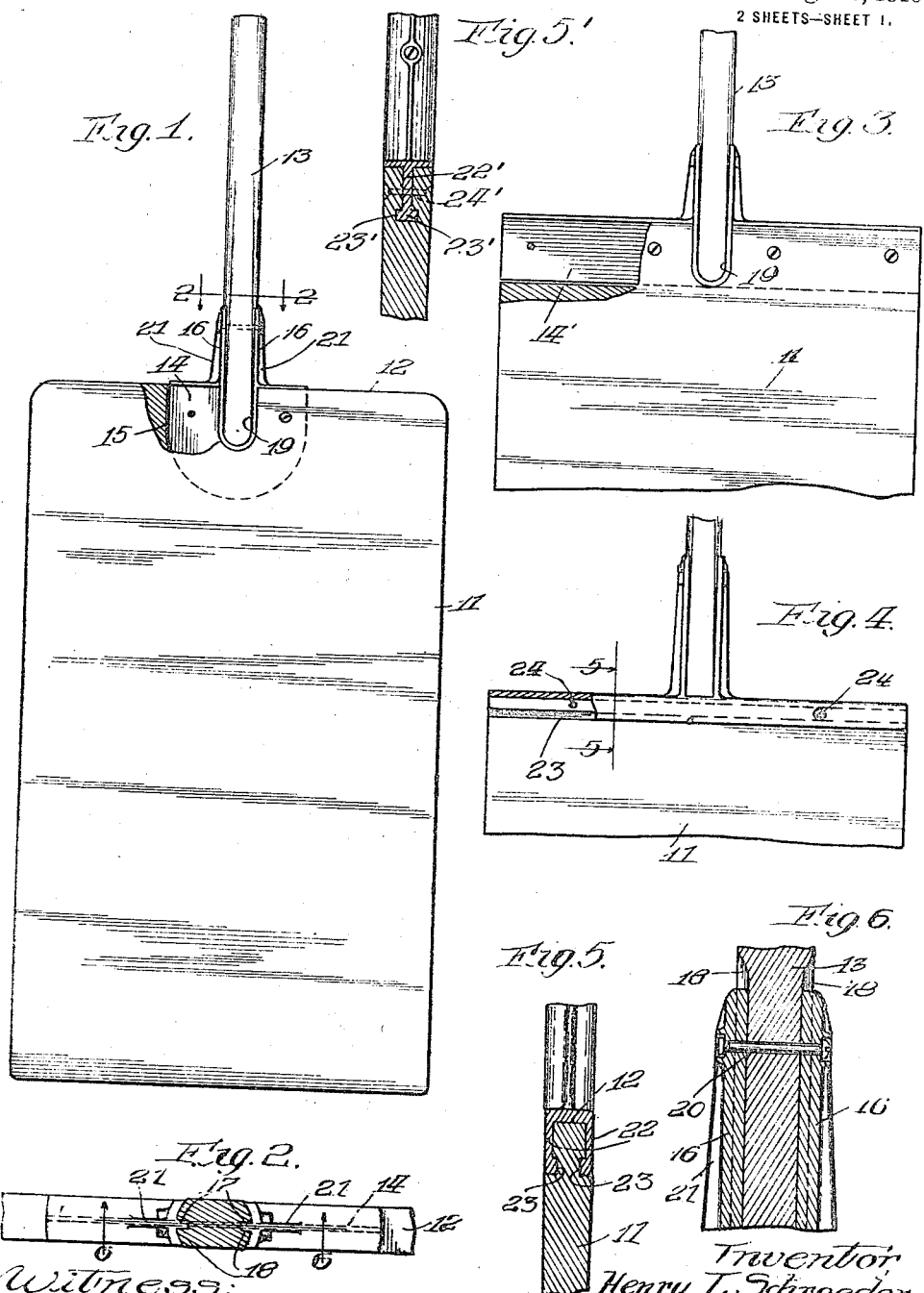

UNITED STATES PATENT OFFICE.

HENRY L. SCHROEDER, OF CHICAGO, ILLINOIS.

BAKER'S PEEL.

1,195,510.  Specification of Letters Patent.  Patented Aug. 22, 1916.

Application filed February 8, 1916. Serial No. 76,913.

*To all whom it may concern:*

Be it known that I, HENRY L. SCHROEDER, a citizen of the United States, residing at Chicago, in the county of Cook and State of Illinois, have invented certain new and useful Improvements in Bakers' Peels, of which the following is a specification.

My invention relates to bakers' peels, and has for its object, the provision of a means for connecting the handle to the blade of a baker's peel, which is simple in construction, efficient in use and comparatively inexpensive to manufacture.

Other objects will appear hereinafter.

An embodiment of my invention is shown in the accompanying drawings forming a part of this specification and in which;—

Figure 1, is a plan view of a baker's peel embodying my invention and having a portion broken away to show underlying parts. Fig. 2, is a section taken on line 2—2 in Fig. 1. Fig. 3, is a fragmental plan view of a slightly modified form of connecting member with a portion broken away to show underlying parts. Fig. 4, is a similar view showing a slightly different form of connecting means than that shown in Figs. 1 and 3. Fig. 5 is an enlarged section taken on line 5—5 in Fig. 4. Fig. 5' is a view showing a modification of the parts shown in Fig. 5. Fig. 6 is an enlarged fragmental section taken on line 6—6 in Fig. 2. Fig. 7 is a plan view of a baker's peel showing a still different form of connecting means between the handle and blade. Fig. 8 is an enlarged fragmental section taken on line 8—8 in Fig. 7. Fig. 9 is a plan view of a baker's peel showing a still different form of connecting means between the blade and handle of the peel; and Fig. 10 is a view showing a modification of the parts shown in Fig. 8.

Referring more particularly to the drawings, the peel I have shown is made up of a blade 11 of substantially conventional construction, except that the heel edge 12 is substantially a straight line providing a substantially rectangular blade. The blade 11 is provided with a handle 13 of conventional design, except for the connection between the handle and blade. This connection comprises my invention.

In providing a blade substantially rectangular in form, considerable material is saved in forming the blade. In conventional blades, portions of the heel end are cut away to provide a connecting means for the handle. This material cut away from the heel portion is saved in my form of blade, since the handle is provided with a connecting means which does not require the extension of the heel portion ordinarily used.

In Figs. 1 to 6 inclusive, I have shown a connecting means adapted to permanently secure the handle to the blade, but which permits of easily replacing the handle should the latter become broken. This connecting means comprises a plate 14 fitted in the heel edge 12 of the blade 11, which has a handle engaging means in one of its edges. The plate 14, is fitted in a saw cut or narrow slot 15, which is cut in the heel edge of the blade. In Fig. 1, the plate 14 is much narrower than the blade 11, while in the form shown in Fig. 3, the plate 14 extends across the entire edge 12 of the blade. It is, therefore, obvious that the plate 14 may be made in any width desired to give sufficient rigidity for connecting the handle 13 to the blade. The narrower widths of the plate 14 are preferable, for the reason that a narrow plate will not affect the contraction and expansion of the blade 11, due to moisture and heat in use.

At the exposed edge of plate 14 at substantially the center thereof, are disposed two spaced arms 16, between which the handle 13 is secured. The handle may extend beyond the rear edge of plate 14, as indicated in Figs. 1 and 3, or it may stop at or near the rear edge of the plate, as indicated in Fig. 4. In either instance, I preferably provide tongues 17 along the adjacent edges of the arms 16, which fit in grooves 18 in the handle. Where the handle 13 extends into the plate, as indicated in Figs. 1 and 3, the tongue and groove connection 17—18 also extends around the edges of the recess 19 to form a rigid connection between the handle and the engaging portion of the plate and arms 16. With said tongue and groove connection, the handle would be free to be moved longitudinally thereof into and out of its socket between the arms 16. To prevent such movement, I provide a bolt 20 which extends through the outer ends of arms 16. This arrangement provides means whereby the handle may be removed by simply removing bolt 20 and sliding the handle from its socket, so that the replacing of a broken handle is an easy matter.

Along the outer edges of the arms 16, I provide ribs 21, which extend along the remote edges of the arms 16. The ribs also extend around the head and nut of bolt 20 in a manner to prevent the hand of the operator from being torn or injured by said head and nut, (see Fig. 6). In Fig. 4, I have shown a slightly different form of plate. In this modification, there are two plates 22, which are adapted to engage the sides of the edge 12 of the blade 11. The plates are provided with ribs 23 which engage suitable recesses or grooves in the blade 11, (see Fig. 5). With this arrangement, the plate member is slid longitudinally thereof into or out of position on the edge 12 of the plate, and is locked in position on the blade by rivets or screws 24, (see Fig. 4). A slight modification of this form is shown in Fig. 5', where the plate 22' extends into a slot cut in the edge 12 of the blade in a similar manner to plate 14, in Fig. 3. The plate 22' however has ribs 23' which extend entirely across the inner edge thereof and engage suitable grooves in the blade 11, (see Fig. 5'). In this form also, the handle connecting member is prevented from lateral movement on the blade by screws 24', or their equivalent.

In Figs. 7, 8 and 9, I have shown a detachable connection between the handle 13 and the plate 25, corresponding to plate 14, in Figs. 1 to 3 inclusive. In this form, the plate may have the shapes of the plates shown in Figs. 1 and 3, or any other preferred shape, such as shown in Fig. 7. In the form of plate used in Fig. 7, such plate has its sharp corners driven into the body of the blade 11 from portions of the recess or slot 26 in which the plate is mounted, thereby insuring a tight fit between the plate and blade. The plate may be further secured in the blade by means of screws or rivets 27.

Centrally of the edge 12 of the blade, a slot 28 is provided on both sides of plate 25, as clearly indicated in Fig. 8. A handle butt having a portion 30, fits loosely in the slot 28 at one side of plate 25, substantially as indicated in Fig. 8. At the inner end of slot 28 is provided a perforation 31 in plate 25, in a position to be engaged by a projection 32 on the portion 30 of the handle butt. An overhanging projection 33, is formed on the handle butt to engage the top surface of plate 25, and adapted to coöperate with projection 32 to provide a means for lifting the blade 11 with the handle 13. The connection between the handle butt 29 and handle 13, is substantially the same, as that indicated in Figs. 1 to 6 inclusive, or when so desired, the ribs 21 may be dispensed with, and a rivet 34 extended through the bifurcated portion of handle butt 29, as clearly indicated in Fig. 9, to prevent the handle from being moved longitudinally thereof from between the bifurcated parts of handle butt 29.

In Fig. 10 I have shown a slight modification of the handle connection just described in Figs. 7 to 9 inclusive. In this form, the projection 32 is shortened so that it does not reach entirely through the plate 25, and the projection 33 extends to substantially the same length as the portion 30 of the handle butt. The handle butt is preferably of a metal which will yield sufficiently to let the projection 31' ride over the under surface of plate 25 until it reaches the opening 31, when it will snap into said opening and be locked therein. By extending projection 33 to form projection 33' in Fig. 10, a screw 35, or its equivalent, may be passed through projection 33' and threaded in portion 30 to form a rigid connection between the plate 25 and handle 13.

In Fig. 9 I have shown plate 25 as being quite narrow. In such a construction the projection 31 engages the inner edge of the plate instead of passing through a perforation, as indicated in Figs. 7 and 8.

While I have illustrated and described the preferred forms of my invention, I do not desire to be limited to the precise details set forth, but desire to avail myself of such variations and changes as come within the scope of the appended claims.

I claim:

1. A peel comprising a blade having a slot extending inwardly from its heel edge and reaching from its top side to its bottom side; a plate embedded in the heel edge of the blade substantially midway between the top and bottom sides thereof and extending through said slot; and a handle member having a portion disposed in said slot at one side of said plate and adapted when the handle member is reversed to be inserted in said slot at the other side of said plate.

2. A peel comprising a blade having a slot extending inwardly from its heel edge and reaching from its top side to its bottom side; a plate embedded in the heel edge of the blade substantially midway between the top and bottom sides thereof and extending through said slot; a handle member having a portion disposed in said slot at one side of said plate and adapted when the handle member is reversed to be inserted in said slot at the other side of said plate; and means removably securing the handle member to said plate.

3. A peel comprising a blade having a slot disposed longitudinally thereof, extending inwardly from its heel edge and reaching from its top to its bottom surfaces; a metallic plate embedded in the heel edge of the blade, extending through said slot and disposed substantially midway between the top and bottom sides of the blade; a handle member disposed in and substantially filling the slot of the blade at one side of the plate, and adapted to be reversed with respect to the blade and extend into and fill said slot at the other side of the plate; and means detachably connecting the handle member with the plate.

4. A peel comprising a blade having a slot disposed longitudinally thereof, extending inwardly from its heel edge and reaching from its top to its bottom surfaces; a metallic plate embedded in the heel edge of the blade, extending through said slot and disposed substantially midway between the top and bottom sides of the blade; a handle member disposed in and substantially filling the slot of the blade at one side of the plate, and adapted to be reversed with respect to the blade and extend into and fill said slot at the other side of the plate; and projections on the handle member engaging said plate and adapted to lock the latter to the handle member regardless of which sides of the plate and blade are uppermost.

In testimony whereof I have signed my name to this specification, in the presence of two subscribing witnesses, on this 4th day of February A. D. 1916.

HENRY L. SCHROEDER.

Witnesses:
CHARLES H. SEEM,
THOMAS COLSON.